United States Patent [19]

Nakai et al.

[11] Patent Number: 4,849,021

[45] Date of Patent: Jul. 18, 1989

[54] PROCESS FOR PRODUCTING COAL FILLERS

[75] Inventors: Masayuki Nakai; Kenji Uesugi; Katsumi Tomura, all of Sodegaura, Japan

[73] Assignee: Idemitsu Kosan Co., Ltd., Tokyo, Japan

[21] Appl. No.: 196,219

[22] PCT Filed: Sep. 17, 1987

[86] PCT No.: PCT/JP87/00684

§ 371 Date: May 6, 1988

§ 102(e) Date: May 6, 1988

[87] PCT Pub. No.: WO88/02015

PCT Pub. Date: Mar. 24, 1988

[30] Foreign Application Priority Data

Sep. 18, 1986 [JP] Japan .................................. 61-217993

[51] Int. Cl.$^4$ ............................ C09C 1/44; C10L 1/32
[52] U.S. Cl. ....................................... 106/472; 106/502; 106/477; 44/51; 44/591; 44/599; 264/293; 23/314
[58] Field of Search ................ 106/472, 502, 477; 44/51, 591, 599; 264/29.3; 23/314

[56] References Cited

U.S. PATENT DOCUMENTS

| | | | |
|---|---|---|---|
| 3,424,556 | 1/1969 | Johnson | 201/29 |
| 3,573,241 | 3/1971 | Gotshall | 106/472 |
| 3,671,613 | 6/1972 | Gotshall | 23/314 |
| 4,052,170 | 10/1977 | Yan | 44/622 |
| 4,127,391 | 11/1978 | Koppelman | 44/591 |
| 4,466,362 | 8/1984 | Maxwell et al. | 44/51 |
| 4,726,810 | 2/1988 | Ignasiak | 44/51 |

Primary Examiner—Paul Lieberman
Assistant Examiner—Helene Kirschner
Attorney, Agent, or Firm—Antonelli, Terry & Wands

[57] ABSTRACT

A process for producing coal fillers, which comprises the steps of:

(a) carbonization step, which comprises carbonizing crushed coal particles having a particle size of not more than 10 mm and an ash content of not more than 10% by weight by thermal decomposition at a temperature of 500° to 2,000° C.; and cooling the carbonized solids;

(b) ultrafine pulverization step, which comprises preparing a slurry of the carbonized solids having a solids content of 10 to 50% by weight by adding a dispersion medium to the carbonized solids; and ultrafinely pulverizing the carbonized solids dispersed in the slurry to reduce the average particle size to not more than 5 μm;

(c) agglomeration step, which comprises adjusting the solids content of the slurry to 1 to 20% by weight by further adding water to the slurry of the ultrafinely pulverized solids; adding an oil having a boiling point of not more than 150° C. to the resulting slurry in a ratio of 30 to 300 parts by weight of the oil per 100 parts by weight of dry solids; agitating the resulting mixture to agglomerate the carbonaceous matters with oil; and separating and recovering the agglomerates; and (d) drying step, which comprises drying the recovered agglomerates by heating them at 50° to 300° C. to evaporate the water and oil retained in the agglomerates; and cooling the dried agglomerates.

13 Claims, No Drawings

PROCESS FOR PRODUCTING COAL FILLERS

TECHNICAL FIELD (1) Field of the Invention

The present invention relates to a novel process for producing coal fillers. More particularly, the present invention relates to an economical process for producing coal fillers that excel in reinforcing rubbers and plastics and can be suitably used in rubber industries, tire industries, plastic industries, etc.

BACKGROUND ART

Carbon blacks has been widely used as reinforcing agents for tires or rubbers, black pigment for printing inks or paints, coloring materials for resins, materials for dry batteries, conductive materials, etc. in various fields. Especially, those for reinforcing tires or rubbers preponderate in demands, and carbon blacks of various qualities are used as materials for the reinforcing agents.

Carbon blacks are usually produced by incomplete combustion or thermal decomposition of hydrocarbonaceous gases or oils originated from petroleum or coal, such as natural gas, petroleum gas, crude naphthalene, creosote oil, pitch oil, or the like. Known processes for the above-mentioned production are furnace method for producing furnace blacks, channel process for producing channel blacks, thermal process for producing thermal blacks, and the like.

However, these methods in which hydrocarbonaceous gases or hydrocarbonaceous oils are used as raw material have defects that the raw material situations are unstable and high cost is inevitable owing to the complicated producing processes.

On the other hand, in order to solve the defects, there was proposed a method of producing coal carbon blacks for rubber-reinforcing agents wherein a solid coal itself is thermally decomposed instead of creosote oil or crude naphthalene obtained by carbonization of coal (Japanese Patent Publication No. 16,107/1963). However, the carbon blacks for coal filler obtained by the method have a disadvantage in their use as a reinforcing agent for rubbers since they have a large ash content which decreases the modulus of rubbers and elongates vulcanization of rubbers.

The object of the present invention is to provide an economical process for producing coal fillers having excellent rubber-reinforcing properties.

DISCLOSURE OF INVENTION

As the result of our researches to attain the object, we found that the object can be easily attained by a novel method of producing coal fillers wherein a slurry of ultrafinely pulverized product obtained by subjecting a coal to specified treatment is treated by means of a specified deliming/agglomeration treatment, i.e. a specified oil-agglomeration technique suitable for agglomeration of ultrafine-particles, and we eventually came to complete the present invention.

According to the present invention, there is provided a process for producing coal fillers which comprises the steps of:

(a) carbonization step, which comprises carbonizing crushed coal particles having a particle size of not more than 10 mm and an ash content of not more than 10% by weight by thermal decomposition at a temperature of 500° to 2,000° C.; and cooling the carbonized solids;

(b) ultrafine pulverization step, which comprises preparing a slurry of the carbonized solids having a solids content of 10 to 50% by weight by adding a dispersion medium to the carbonized solids; and ultrafinely pulverizing the carbonized solids dispersed in the slurry to reduce the average particle size to not more than $5\mu$;

(c) agglomeration step, which comprises adjusting the solids content of the slurry to 1 to 20% by weight by further adding water to the slurry of the ultrafinely pulverized solids; adding an oil having a boiling point of not more than 150° C. to the resulting slurry in a ratio of 30 to 300 parts by weight of the oil per 100 parts by weight to dry solids; agitating the resulting mixture to agglomerate the carbonaceous matter with oil; and separating and recovering the agglomerates; and (d) drying step, which comprises drying the recovered agglomerates by heating them at 50° to 300° C. to evaporate the water and oil retained in the agglomerates; and cooling the dried agglomerates.

The coals which may be used in the step (a) to be carbonized by thermal decomposition have an ash content of not more than 10% by weight, preferably not more than 7% by weight, more preferably 3% by weight. The illustrative examples of coals to be used as the raw material include anthracite, bituminous coal, sub-bituminous coal, brown coal, lignite, peat or marl, and the like. The preferred are those having an ash content of not more than 10% by weight or those from which coals having an ash content of not more than 10% by weight can be easily separated by gravity separation or the like. Furthermore, from the viewpoint of facility of pulverization treatment following to the carbonization, non-caking coals or semi-caking coals are preferable, and non-caking coals are particularly preferable. These coals may either be used individually or in combination of two or more of them.

In the process according to the present invention, in order to reduce the ash content of the end products, it is desirable to use a coal having a lower ash content that is selected from the above described coals or, at need, separated from a coal by gravity separation or the like.

The separation of coals having an ash content of not more than 10% by weight can be carried out by separating coals having a low specific gravity of not higher than about 1.3, i.e. coals having a low ash content, by means of a gravity separation such as flotation, heavy fluid separation, etc.

In the process of the present invention, the above described coals are carbonized by thermal decomposition to remove volatile constituents including those originated by the decomposition, and the coals to be used are those previously crushed coarsely to a particle size of not more than 10 mm, in order to equalize the effects of the carbonization. The preferable particle size cannot be uniformly limited since it varies depending upon the type of the carbonization furnace, carbonization temperature, the content of volatile constituents or ash constituents in the coal, etc., and any size will do so long as the volatile constituents can be rapidly and uniformly removed. As the method of crushing, any conventional method can be employed.

Also, the crushing may be conducted before the gravity separation described above.

The carbonization of coals by thermal decomposition is conducted by heating the crushed coal particles, under the condition of no air additions, usually at 500° to 2,000° C., preferably 550° to 1,800° C., more preferably at 600° to 1,500° C., usually for 2 to 3 hours. Although the carbonization by thermal decomposition may be conducted in vacuum or in the atmosphere of an inert gas such as nitrogen, etc. or an inert industrial waste gas, a method in that the carbonization is conducted, under the condition that air is shut out, in a gas mixture of hydrogen, methane, carbon monoxide, carbon dioxide, etc. which are generated from coal by thermal decomposition may be suitably employed.

The furnace to be used for the carbonization by thermal decomposition may be either of continuous system or batch system with the proviso that it is of closed system. Although any conventional heating method such as electric heating method, gas-combustion heating methods, and the like may be employed, preferable heating method is a gas-combustion method because the combustible gases, i.e. methane, other gaseous hydrocarbons, hydrogen, carbon monoxide, etc., which are recovered from the volatile components being generated in the carbonization process, can be advantageously used as fuels for heating the furnace.

If the temperature of carbonization is less than 500° C., residual volatile components remains in the carbonized solids, resulting in that the obtained coal fillers can not be suitably used as reinforcing agents for rubbers. The residual volatile constituents deteriorates the rubber-reinforcing properties. Further, at the time of vulcanization of rubbers, the residual volatile constituents hinder the vulcanization reaction and are volatilized, causing an insufficient vulcanization of the rubbers. On the contrary, if the temperature is more than 2,000° C., the graphitization of the coals occurs, resulting in the production of undesirable coal fillers having poor rubber-reinforcing properties.

After the conclusion of the carbonization, the resulting solids (Hereinafter, we will sometimes call them char) are usually cooled as they are, i.e. under the condition that air is shut out.

In the step (b), the solids (chars), which are the carbonized products obtained by the above described carbonization by thermal decomposition, are then ultrafinely pulverized usually to an average particle size of not more than 5 $\mu$m, preferably not more than 1 $\mu$m.

If the average particle size is more than 5 $\mu$m, the rubber-reinforcing properties (tensile strength, abrasion resistance, flexural strength, heat build-up, etc.) are decreased.

The illustrative examples of machines to be used for the ultrafine pulverization include ball mill and the like.

The ultrafine pulverization is conducted on the slurry of the chars dispersed in a dispersion medium. In order to increase the pulverizing efficiency, it is desirable to coarsely pulverize the chars, previously, to a particle size of about 200 mesh or below, at need. In addition to water, various kinds of dispersion medium may be used. The solids content of the slurry is 10 to 50% by weight. In order to increase the pulverization efficiency, it is desirable to increase the solids content of the slurry to about 30 to 50% by weight by adding a proper dispersing agent or the like. The pulverization efficiency can be further increased by adding a proper antifoaming agent to restrain the generation of air bubbles.

Any dispersion medium and antifoaming agent conventionally used for carbon-water slurries may be used. Some illustrative examples of the dispersion medium include polystyrene sulfonic acid, polycarboxylic acid, lignosulfonic acid, etc. Some illustrative examples of the dispersing agents include methanol, ethanol, acetone, etc.

The slurries of the ultrafinely pulverized chars can be obtained by the above described methods. At need, the slurries of the ultrafinely pulverized chars may be subjected to separation/classification treatment to remove alien substances or coarse particles which will decrease the rubber-reinforcing properties.

That is, the coarse particles included in the ultrafinely pulverized particles or in the slurries thereof are classified and separated to be removed along with the alien substances. The coarse particles to be removed are usually those having a particle size of not les than 5 $\mu$m, preferably not less than 2 $\mu$m. If the particles having a particle size of more than 5 $\mu$m is remained, the rubber-reinforcing properties of resulting coal fillers are decreased. The iron contents, which are contained in the starting coal or got mixed as a result of abrasion of apparatuses or grinding-media, can be efficiently removed by the use of a magnet. If the iron contents remains, they sometimes pollute the surfaces of rolls or metal molds when the resulting coal fillers are kneaded with rubbers.

Usual methods, such as centrifugal separation method, wet-cyclone method, etc., may be employed for the separation/classification treatment.

When a wet separation/classification is conducted, it is desirable to adjust the solids content of the slurries to 1 to 20% by weight, preferably about 5 to 10% by weight, by dispersing the slurries in a dispersion medium such as water or by diluting them with a diluting agent, in order to increase the separation efficiency.

The separation/classification efficiency can be further increased by adding a dispersing agent, especially a dispersing agent that can homogeneously disperse particles having a particularly high cohesive strength, into the slurries. As such dispersing agents, the above described dispersing agents may be used.

In the step (c), the slurry of the ultrafinely pulverized solids treated by the above described separation/classification is then subjected to deliming/agglomeration treatment. In this step, the ash constituents contained in the ultrafinely pulverized solids are separated and removed because the ash constituents decrease the rubber-reinforcing properties, and, at the same time, the ultrafinely pulverized solids are agglomerated to form agglomerates having a proper strength, so that they can tolerate the treatment to a product article and can easily and homogeneously disperse in rubbers when they are blended and kneaded with rubbers.

One of the most important characteristics of the process of the present invention is that an oil-agglomeration method using an oil having a low boiling point is employed to carry out the deliming and agglomeration simultaneously.

The deliming and agglomeration by means of oil-agglomeration is a method of agglomerating only carbonaceous matters to separate them from ash constituents, taking advantage of the antipodal properties thereof, i.e. the hydrophilic property of the ash constituents and the lipophilic property of the carbonaceous matters. In this method, the ash constituents are dispersed into water and only the carbonaceous matters are aggregated and agglomerated, by adding an oil having a low boiling point into the water slurry of the ultrafinely pulverized solids and then agitating the mixture. The aggregated and agglomerated carbonaceous matters are then separated and recovered from the slurry by means of a screen, net, or the like to be fed to the next step. This method permits the production of agglomerates free from binder oils or the like, because the water and oil retained in the agglomerates are removed by evaporation and, thus, the strength of the agglomerates is provided only by the adhesive force of the ultrafinely pulverized solids without the aid of a binder.

In the conventional oil-agglomeration methods for coal, a heavy oil or the like is used in order to increase the strength of agglomerates, and the residue of these oils in the agglomerates decreased the rubber-reinforcing properties. The oil-agglomeration method according to the present invention is free from such a problem.

The solids content of the ultrafinely pulverized solids-water slurry to be used in the oil-agglomeration of the present invention is 1 to 20% by weight, preferably 5 to 10% by weight.

Although the oil-agglomeration may be usually conducted at a temperature of 0° to 60° C., it can be suitably conducted at room temperature.

The treating time is usually about 1 to 30 minutes and the preferred and enough time is about 5 to 15 minutes.

The oil to be added for the deliming and agglomeration by oil-agglomeration may be any one of paraffin oils, aromatic oils, and naphthene oils having not more than 8 carbon atoms and a boiling point of not more than 150° C. The preferred are those able to be readily removed by evaporation in the following drying step, i.e. those having a boiling point of not more than 120° C., for example, low molecular weight hydrocarbon oils, such as, aromatic oils such as toluene, benzene, xylene, etc., and aliphatic oils such as hexane, heptane, octane, etc.; and freons such as trichlorotrifluoroethane, etc.

These may be pure ones or mixtures thereof, or may be containing a small amount of water. Further, process oils or the like for rubbers may also be used in combination.

The ratio of the above described oils to the ultrafinely pulverized solids-water slurry, which cannot be uniformly limited since it varies depending upon the kind of the oil and the solids content of the slurry, is 30 to 300 parts by weight, preferably 75 to 150 parts by weight, of the oils per 100 parts by weight of dried ultrafinely pulverized solids.

If the amount of the oils is less than 30 parts by weight, the aggregation and agglomeration cannot occur and the ash constituents cannot be removed. On the other hand, if it exceeds 300 parts by weight, the particle size of the agglomerates is enlarged too much.

Thus, the ash content of the carbonaceous matters separated and recovered by deliming and agglomeration is reduced to not more than 5% by weight, preferably not more than 2% by weight.

If the ash content is more than 5% by weight, when the coal fillers (end products) are used as a reinforcing agent for rubber, there occur the decrease of durability of rubbers such as increases of internal exothermic, abrasion, flex cracking, compression set, etc. and the decrease of the mechanical properties, tensile strength and ultimate elongation.

Ash constituents, as described above, severely deteriorate various properties, dynamic properties and static properties, and elongate the time of vulcanization, which is an important element in the productivity of vulcanized rubbers, causing the decrease of operation efficiency.

The particle size of the agglomerates can be easily controlled by controlling the amount of oil to be added, and, for the convenience of handling the end products, the secondary particle size (particle size of the agglomerates) is preferably about 0.5 to 3 mm.

The aggravation of work environments can be prevented by employing the oil-agglomeration method for ultrafine particles because, in this method, the ultrafine particles, which scatter readily and is hard to handle, can be agglomerated in a state of slurry thereof.

The end products, which are produced by drying the agglomerates, exhibit a sufficient particle strength at practical use even in the case where an oil having a low boiling point is used. Also, the particle strength of the end products may be further increased by conducting the oil-agglomeration using a dissolved mixture of a binder material and the above described oil and then drying to evaporate the oil alone.

Any usual compounding ingredient may be used as the binder, so long as it does not injure the rubber-reinforcing properties. The preferred are higher fatty acids such as stearic acid, palmitic acid, etc.

In order to further increase the rubber-reinforcing properties by improving the conformability to rubbers of the coal fillers, an oil in which a surface modifier for ultrafinely pulverized particles is dissolved may be used for the oil-agglomeration. The surface modifier is uniformly coated on the surface of the coal fillers by drying the agglomerates to evaporate the oil alone.

Effective surface modifiers are process oils, activators, vulcanization accelerators, etc., which are a kind of compounding ingredients for rubbers. Heretofore, surface modifiers have been added at the time of blending with rubbers. The complexity of the rubber blending step can be reduced by adding the surface modifiers at the time of production of fillers.

In the step (d), the recovered agglomerates of the carbonaceous matters, i.e. wet coal fillers, are dried to evaporate water retained in the agglomerates, the oils having a low boiling point, etc., which are used in the above oil-agglomeration, and are cooled to obtain the objective end product, a coal filler.

The drying can be conducted by various usually drying methods. For example, it is conducted in an atmosphere of an inert gas such as gaseous nitrogen, at 50° to 300° C., preferably 100° to 200° C., more preferably 110° to 150° C.

The drying and cooling may be conducted either in continuous system or batch system. Any conventional drier and cooler may be used. Preferred are those of rotary kiln system or fluidized bed system for the purpose of preventing the powdering of the agglomerates by cracking.

The process of the present invention permits a sharp reduction in the quantity of heat necessary for the drying in comparison with a method where a slurry of ultrafinely pulverized solids is directly dried, because the drying in this process is conducted after the agglomeration and the separation of water.

That is, thus recovered undry coal fillers retain 0.3 to 1 kg of water and 0.3 to 2 kg of the oil per 1 kg of dry solids, and the energy required for drying them is only one third to one thirtieth of that required for directly drying the slurry, and thus a sharp reduction in energy and time for drying can be attained.

The following table shows a comparison of energies required for the two types of drying method.

TABLE

|  | Drying after oil-agglomeration | Direct drying of 5% slurry |
|---|---|---|
| Water content per 1 kg of dry solids | 0.5 kg/kg-solids | 19 kg/kg-solids |
| Toluene content per 1 kg of dry solids | 0.7 kg/kg-solids | 0 |
| Energy required for evaporating water and toluene (150° C.) | 428 kcal/kg-solids | 12,460 kcal/kg-solids |
| Amount of kerosene required for evaporation (converted from energy) (8,300 kcal/l) | 0.051 l/kg-solids | 1.50 l/kg-solids |

The oils evaporated with a drying apparatus can be recycled after they are condensed by cooling and recovered by separating water.

The coal fillers thus produced due to their extremely excellent and well-balanced rubber-reinforcing properties and cheapness in price are useful as a rubber-reinforcing agent in fields of rubber industries, tire industries, and the like. That is, the blending of the coal fillers prepared by the process of the present invention into rubbers is extremely effective in increasing various properties of the rubbers, such as heat build-up, flexural strength, abrasion resistance, tensile strength, tear strength, ultimate elongation, and the like, is considerably increased, and in shortening the vulcanization time.

BEST MODE FOR CARRYING OUT THE INVENTION

COMPARATIVE EXAMPLE 1

Cerrejon coal (sub-bituminous coal) was carbonized by heating at 750° C. for 3 hours in a box furnace of batch system, and the obtained carbonized solids were then cooled to room temperature. To the resulting solids was added water to prepare a slurry having a solids content of 30% by weight. The slurry was agitated in a ball mill of grinding-media system to ultrafinely pulverized the solids to submicron particle size.

The resulting slurry of ultrafinely pulverized solids was diluted with water to a solids content of 10% by weight. After iron contents were removed from the diluted slurry using a magnet, coarse particles were separated from the slurry by means of a wet cyclone.

The resulting slurry of ultrafine particles without coarse particles were heated at 120° C. for 24 hours to evaporate water, and the obtained dry product was subjected to Rubber Compounding Tests.

COMPARATIVE EXAMPLE 2

Cerrejon coal (sub-bituminous coal) was subjected to gravity separation using a heavy liquid having a specific gravity of 1.40 to separate and recover a coal having a specific gravity of not more than 1.40. The obtained coal was carbonized by heating at 750° C. for 3 hours in a box furnace of batch system, and the obtained carbonized solids were cooled to room temperature. To the resulting solids was added water to prepare a slurry having a solids content of 30% by weight. The slurry was then agitated in a ball mill of grinding-media system to ultrafinely pulverize the solids to submicron particle size The resulting slurry of ultrafinely pulverized particles was diluted with water to a solid content of 10% by weight. After iron contents were removed from the slurry using a magnet, coarse particles were separated by means of wet cyclone.

The resulting slurry of ultrafine particles without coarse particles were heated at 120° C. for 24 hours to evaporate water, and the obtained dry product was subjected to Rubber Compounding Tests.

COMPARATIVE EXAMPLE 3

The procedure of Comparative Example 2 was repeated with the exception that a coal having a specific gravity of not more than 1.3 that was separated from Cerrejon coal by gravity separation using heavy liquid having a specific gravity of 1.30 was used.

EXAMPLE 1

Cerrejon coal (sub-bituminous coal) was subjected to gravity separation using a heavy liquid having a specific gravity of 1.30 to separate and recover a coal having a specific gravity of not more than 1.30. The recovered coal was crushed to a particle size of not more than 10 mm, and the crushed coal was carbonized by heating at 750° C. for 3 hours in a box furnace of batch system. The obtained carbonized solids were then cooled to room temperature. To the solids was then added water to prepare a slurry having a solids content of 30% by weight. The slurry was agitated in a ball mill of grinding-media system to ultrafinely pulverize the solids to submicron particle size.

To the slurry of ultrafinely pulverized particles was diluted with water to a solids content of 10% by weight. After iron contents were removed from the slurry using a magnet, coarse particles are separated by means of wet cyclone.

To the slurry of the ultrafine particles without coarse particles was added toluene (boiling point: 110.7° C.) in a ratio of 1 ml of toluene per 1 g of solids. The mixture was then agitated to oil-agglomerate the ultrafine particles until the particle size is enlarged to about 1 mm. The ash constituents were then removed by recovering the agglomerated secondary particles using a screen.

The recovered agglomerates dried by heating at 120° C. for 24 hours to evaporate water and toluene, and the obtained dry product was subjected to Rubber Compounding Tests.

EXAMPLE 2

The procedure of Example 1 was repeated with the exception that Cerrejon coal not subjected to gravity separation was used.

EXAMPLE 3

The procedure of Example 1 was repeated with the exception that a coal having a specific gravity of not more than 1.26 separated from Cerrejon coal by gravity separation using a heavy liquid having a specific gravity of 1.26 was used.

EXAMPLE 4

The procedure of Example 1 was repeated with the exception that a coal having a specific gravity of not more than 1.35 separated form Cerrejon coal by gravity separation using a heavy liquid having a specific gravity of 1.35.

COMPARATIVE EXAMPLE 4

Loy Yang coal (brown coal) was carbonized by heating at 650° C. for 2 hours in a box furnace of batch system, and the carbonized solids were cooled to room temperature. To the resulting solids was added water to prepare a slurry having a solids content of 30% by weight. The slurry was then agitated in a ball mill of grinding-media system to ultrafinely pulverize the solids to submicron particle size.

The slurry of the ultrafinely pulverized particles was diluted with water to a solids content of 10% by weight. After iron contents were removed using a magnet, coarse particles were separated by means of wet cyclone.

The obtained slurry of ultrafine particles without coarse particles was dried by heating at 120° C. for 24 hours to evaporate water, and the obtained dry product was subjected to Rubber Compounding Tests.

EXAMPLE 5

Loy Yang coal (brown coal) was crushed to a particle size of not more than 10 mm. The crushed coal was carbonized by heating at 650° C. for 2 hours in a box furnace of batch system, and the obtained carbonized solids were cooled to room temperature. To the solids was then added water to prepare a slurry having a solids content of 30% by weight. The slurry was agitated in a ball mill of grinding-media system to ultrafinely pulverize the solids to submicron particle size.

The slurry of the ultrafinely pulverized particles was diluted with water to a solids content of 10% by weight. After iron contents were removed using a magnet, coarse particles were separated by means of wet cyclone.

To the slurry of the ultrafine particles without coarse particles was added toluene in a ratio of 1 ml of toluene per 1 g of solids. The mixture was then agitated to oil-agglomerate the ultrafine particles until the particle size is enlarged to about 1 mm. The ash constituents were then removed by recovering the agglomerated secondary particles using a screen.

The recovered agglomerates were dried by heating at 120° C. for 24 hours to evaporate water, and the obtained dry product was subjected to Rubber Compounding Tests.

COMPARATIVE EXAMPLE 5

GPF carbon black produced by oil-furnace method (NITTERON #55, produced by Shin-Nittetsu Kagaku K.K.) was subjected to Rubber Compounding Tests.

COMPARATIVE EXAMPLE 6

The procedure of Comparative Example 1 was repeated with the exception that a slurry was prepared by adding water to uncarbonized Cerrejon coal.

COMPARATIVE EXAMPLE 7

The procedure of Comparative Example 1 was repeated with the exception that the carbonization of Roy-Young coal was conducted at 400° C.

EXAMPLE 6

The procedure of Example 5 was repeated with the exception that the carbonization of Loy Yang coal was conducted at 500° C.

EXAMPLE 7

The procedure of Example 5 was repeated with the exception that the carbonization of Loy Yang coal was conducted at 650° C. for 3 hours.

EXAMPLE 8

The procedure of Example 5 was repeated with the exception that the carbonization of Loy Yang coal was conducted at 900° C. for 3 hours.

EXAMPLE 9

The procedure of Example 5 was repeated with the exception that the carbonization of Loy Yang coal was conducted at 1,100° C. for 3 hours.

EXAMPLE 10

The procedure of Example 5 was repeated with the exception that the carbonization of Loy Yang coal was conducted at 1,500° C. for 3 hours.

COMPARATIVE EXAMPLE 8

The procedure of Example 5 was repeated with the exception that the carbonization of Loy Yang coal was conducted at 1,800° C. for 4 hours.

EXAMPLE 11

Loy Yang coal (brown coal) was crushed to a particle size of not more than 10 mm. The crushed coal was carbonized by heating at 650° C. for 3 hours in a box furnace of batch system, and the resulting carbonized solids were cooled to room temperature. To the solids was then added water to prepare a slurry having a solids content of 30% by weight. The slurry was agitated in a ball mill of grinding-media system to ultrafinely pulverize the solids to submicron particle size.

The obtained slurry of the ultrafinely pulverized particles was diluted with water to a solids content of 10% by weight. After iron contents were removed from the diluted slurry, coarse particles were separated by means of wet cyclone.

To the slurry of the ultrafine particles without coarse particles was added trichlorotrifluoroethane in a ratio of 1 ml of trichlorotrifluoroethane per 1 g of solids. The mixture was then agitated to oil-agglomerate the ultrafine particles until the particle size is enlarged to about 1 mm. The ash constituents were then removed by recovering the agglomerated secondary particles using a screen.

The recovered agglomerates were dried by heating at 120° C. for 24 hours to evaporate water and trichlorotrifluoroethane, and the obtained dry product was subjected to Rubber Compounding Tests.

EXAMPLE 12

The procedure of Example 7 was repeated with the exception that 0.02% by weight of polyethylene sulfonic acid and 5% by weight of ethanol were added to the slurry before the ultrafine pulverization.

EXAMPLE 13

The procedure of Example 7 was repeated with the exception that, in the oil-agglomeration step, a solution in that stearic acid, i.e. a compounding ingredient for rubber, was dissolved in toluene in a ratio of 0.02 mg of stearic acid per 1 ml of toluene was added to the slurry in a ratio of 1 ml of the solution per 1 g of the solids.

EXAMPLE 14

The procedure of Example 7 was repeated with the exception that in the oil-agglomeration step, a solution in that a rubber process oil (DIANA PROCESS OIL AH-58 produced by Idemitsu Kosan Co., Ltd.) was dissolved in toluene in a ratio of 0.05 ml of the process oil per 0.95 ml of toluene was added to the slurry in a ratio of 1 ml of the solution per 1 g of the solids.

The properties of the starting coals and the properties of the products in Comparative Examples 1 to 4 and Examples 1 to 5 are shown in Table 1, and those in Comparative Examples 5 to 8 and Examples 6 to 14 are shown in Table 2.

In order to strictly inquire the effect of ash content by measuring ash content and volatile matter content of the products in Table 1 and Table 2, each product was dried again at a temperature of not less than 105° C. to reduce the water content to 0% previous to the tests.

The measurement of primary particle size was conducted by high speed centrifugal sedimentation method using an automatic particle size distribution analyzer (Horiba Seisaku-sho, CAPA-500).

In accordance with JIS K 6383 Test Method for Synthetic Rubber-SBR, formulations having the composition described below were prepared by blending thus obtained coal fillers and other ingredients with the rubbers using a 8-inch-double roll mill. Mooney viscosity of the resulting compounded rubbers was measured according to JIS K 6300 Physical Test Method for Unvulcanized Rubbers. The compounded rubbers were then vulcanized under the conditions that were preestablished using JSR Curelastometer III.

| Formulation | |
|---|---|
| (1) SBR 1500 | 100 (pbw) |
| (2) Zinc oxide No. 1 | 5 (pbw) |
| (3) Stearic acid | 1 (pbw) |
| (4) Vulcanization accelerator DM | 1.2 (pbw) |
| (5) Vulcanization accelerator TS | 0.2 (pbw) |
| (6) Sulfur | 2 (pbw) |
| (7) Activator (ACTING B) | 3 (pbw) |
| (8) Coal filler | variable |

The amounts of the coal filler were varied as shown in Table 3.

In Comparative Examples 1 to 4 and Examples 1 to 5, in order to strictly compare the effects of the ash contents, the amounts of coal filler were varied so that compounded rubbers having the same content of actual carbonaceous matters and having varying ash contents could be obtained. In other Comparative Examples and Examples, 50 parts by weight of coal filler was blended.

The components used for the compounded rubbers are those produced by the following companies.
(1) Styrene Butadiene Rubber produced by Japan Synthetic Rubber Co., Ltd.
(2) produced by Sakai Chemical Industry Co., Ltd.
(3) produced by Asahi Denka Kogyo K.K.
(4) Dibenzothiazol disulfide produced by Ouchi Shinko Kagaku K.K.
(5) Tetramethylthiuram monosulfide produced by Ouchi Shinko Kagaku K.K.
(6) Powder sulfur #325 produced by Hosoi Kagaku Kogyo K.K.
(7) produced by Yoshitomi Pharmaceutical Industries, Ltd.

The properties of the vulcanized compounded rubbers containing the coal fillers obtained in Comparative Examples 1 to 8 and Examples 1 to 14 are shown in Table 4 and Table 5.
(1) according to JIS K 6300
(2) 155° C., JSR Curelastometer III, based on T max. (Black T 90 on the market)
(3) according to JIS K 6301, tension speed: 500 mm/min, measuring temperature: 25° C., test piece: Dumbbell No. 3
(4) according to JIS K 6301, tension speed: 500 mm/min, measuring temperature: 25° C., test piece: Type-B
(5) according to JIS K 6301, JIS A hardness meter
(6) Goodrich Flexometer, measuring temperature: 50° C., amplitude: 0.255 inch, load: 24 lb., rotational frequency: 1800 rpm, measuring time: 25 minutes
(7) according to JIS K 6301, measuring temperature: 23° C., 2 mm-notch
(8) according to JIS K 6301
(9) according to JIS K 6301, measuring temperature: 70° C., measuring time: 22 hours
(10) BRIDGESTONE Standard 903 part A9 Method-C
*, , *: based on Comparative Examples 1 and 3.

Abrasion resistance, heat build-up, and flexural strength are particularly important properties of carbon blacks among other rubber reinforcing properties.

These properties of carbon blacks varies depending upon the grade, the grade varying depending upon the particle size and the strength of structure. Generally, those excelling in the abrasion resistance are inferior in the exothermic resistance and, on the contrary, those excelling in exothermic resistance are inferior in the abrasion resistance.

The lesser the internal exothermic, flex cracking, and AKRON Abrasion loss which are shown in Table 4 and Table 5 are, the more the carbon blacks excel in the exothermic resistance, flexural strength, and abrasion resistance, respectively.

In the Examples 1 to 5 as opposed to Comparative Examples 1 to 4, the ash constituents in the coals are removed by gravity separation and oil-agglomeration or by oil-agglomeration alone. As far as conventional carbon blacks are concerned, abrasion resistance and exothermic resistance are reciprocal properties, that is, the more one is excellent, the more the other is inferior. However, the comparison of the Comparative Examples 1 to 3 with the opposed Examples 1 to 3 indicates that the removal of ash constituents from coal fillers results in the reduction of all the internal exothermic, flex cracking, and AKRON Abrasion and in the improvement of both the exothermic resistance and abrasion resistance, which have been the conflicting properties. It shows that the ash constituents have a bad influence to all of the abrasion resistance, exothermic resistance, and flexural strength. Further, in comparison with the coal fillers obtained in Comparative Examples 1 wherein no removal of the ash constituents was conducted, the coal fillers obtained in Examples 1 to 4 wherein the residual ash content was reduced to not more than about 5% by weight extremely improved the exothermic resistance, abrasion resistance, abrasion resistance, and flexural strength.

The results of the tests in Example 4 which corresponding to Comparative Example 5 were similar to those described above.

Further, the ash constituents have bad influences to other rubber-reinforcing properties, This was definitely shown by the fact that the separation and removal of the ash constituents from the coal fillers reduced the vulcanizing time, and improved the tensile properties, i.e. the tensile strength, ultimate elongation, and tear strength, and increased the impact resilience percentage, and reduced compression set. Therefore, from the viewpoint of the improvement of the whole rubber-reinforcing properties, the removal of the ash constituents from coal fillers is extremely advantageous.

Comparing the Comparative Example 7 in which the carbon black produced by oil-furnace method with Examples 6 to 10 in which the carbonization by thermal decomposition was conducted at a temperature of 500° to 1,500° C., the coal fillers produced according to the present invention afford a tensile strength equal or superior to that afforded by the carbon black produced by oil-furnace method, lesser heat build-up, and larger impact resilience. It shows that the coal fillers have properties desirable for reinforcing rubbers.

The coal filler obtained in Comparative Example 6, in which carbonization by thermal decomposition was not conducted, required longer vulcanizing time in comparison with those obtained in Examples 6 to 10. Also, it is inferior in rubber-reinforcing properties as shown in its low 100%-modulus, tensile strength, and tear strength and large flex cracking.

Similarly, in Comparative Example 7 in which the carbonization was conducted at 400° C., the vulcanizing time was longer than that of Examples 6 to 10, and afforded lesser 300%-modulus, tensile strength, and tear strength and larger flex cracking in comparison with Examples 6 to 10. On the other hand, in Comparative Example 8, in which the temperature of carbonization was so high as 1,800° C., the 100%-modulus, 300%-modulus, and tensile strength were lesser and the heat build-up was larger, in comparison with those of Examples 6 to 10.

Also, good results were obtained in Example 11, in which the oil-agglomeration was conducted using a freon.

In Example 12, in which a dispersing agent and an antifoaming agent were added to the slurry before the ultrafine pulverization, the pulverizing efficiency was improved as shown in the reduced particle size of the obtained coal filler.

In Examples 13 and 14, in which a higher fatty acid was used as a binder in order to increase the strength of agglomerates, a tensile strength higher than that of Example 7, in which the surface treatment was not conducted, was obtained.

As described above, the coal fillers of the present invention directly produced from a coal are superior in static properties and dynamic properties even to the carbon blacks produced by oil-furnace method.

TABLE 1

Properties of starting coals and resulting products

| Examples and Comparative Examples | Starting coal | | | | Carbonization | |
|---|---|---|---|---|---|---|
| | Kind of coal | Volatile matter content wt % | Ash content wt % | Deliming | Temperature °C. | Time hr |
| Comparative Example 1 | Cerrejon | 36.2 | 9.1 | None | 750 | 3 |
| Comparative Example 2 | Cerrejon | 36.2 | 9.1 | Gravity separation (Specific gravity:1.40) | 750 | 3 |
| Comparative Example 3 | Cerrejon | 36.2 | 9.1 | Gravity separation (Specific gravity:1.30) | 750 | 3 |
| Example 1 | Cerrejon | 36.2 | 9.1 | Gravity seperation +OA (Specific gravity:1.30) | 750 | 3 |
| Example 2 | Cerrejon | 36.2 | 9.1 | OA | 750 | 3 |
| Example 3 | Cerrejon | 36.2 | 9.1 | Gravity seperation +OA (Specific gravity:1.26) | 750 | 3 |
| Example 4 | Cerrejon | 36.2 | 9.1 | Gravity seperation +OA (Specific gravity:1.35) | 750 | 3 |
| Comparative Example 4 | Loy Yang | 49.3 | 1.6 | None | 650 | 2 |
| Example 5 | Loy Yang | 49.3 | 1.6 | OA | 650 | 2 |

| Examples and Comparative Examples | Properties of resulting product | | | | | | |
|---|---|---|---|---|---|---|---|
| | Primary particle size μm | Secondary particle size mm | Moisture content wt % | Ash content wt % | Volatile matter content wt % | pH | Iodine adsorption number mg/g |
| Comparative Example 1 | 0.74 | — | 0.0 | 18.14 | 3.80 | 6.19 | 279 |
| Comparative Example 2 | 0.71 | — | 0.0 | 10.80 | 3.91 | 6.28 | 287 |
| Comparative Example 3 | 0.65 | — | 0.0 | 8.18 | 3.96 | 6.28 | 290 |
| Example 1 | 0.69 | 1.5 | 0.0 | 3.46 | 4.16 | 6.37 | 296 |
| Example 2 | 0.68 | 1.0 | 0.0 | 5.62 | 4.01 | 6.00 | 291 |
| Example 3 | 0.67 | 1.2 | 0.0 | 1.98 | 4.33 | 6.39 | 298 |
| Example 4 | 0.71 | 0.8 | 0.0 | 4.43 | 4.08 | 6.32 | 294 |
| Comparative Example 4 | 0.65 | — | 0.0 | 3.52 | 7.01 | 8.18 | 407 |
| Example 5 | 0.64 | 1.2 | 0.0 | 0.96 | 7.23 | 8.07 | 412 |

OA: oil-agglomeration

TABLE 2

Properties of starting coals and resulting product

| Examples and Comparative Examples | Starting coal | | | | Carbonization | |
|---|---|---|---|---|---|---|
| | Kind of coal | Volatile matter content wt % | Ash content wt % | Deliming | Temperature °C. | Time hr |

TABLE 2-continued

Properties of starting coals and resulting product

| | | | | | | |
|---|---|---|---|---|---|---|
| Comparative Example 5 | GPF | — | — | — | — | — |
| Comparative Example 6 | Cerrejon | 36.2 | 9.1 | None | — | — |
| Comparative Example 7 | Loy Yang | 49.3 | 1.6 | OA | 400 | 2 |
| Example 6 | Loy Yang | 49.3 | 1.6 | OA | 500 | 2 |
| Example 7 | Loy Yang | 49.3 | 1.6 | OA | 650 | 3 |
| Example 8 | Loy Yang | 49.3 | 1.6 | OA | 900 | 3 |
| Example 9 | Loy Yang | 49.3 | 1.6 | OA | 1100 | 3 |
| Example 10 | Loy Yang | 49.3 | 1.6 | OA | 1500 | 3 |
| Comparative Example 8 | Loy Yang | 49.3 | 1.6 | OA | 1800 | 4 |
| Example 11 | Loy Yang | 49.3 | 1.6 | OA | 650 | 3 |
| Example 12 | Loy Yang | 49.3 | 1.6 | OA | 1500 | 3 |
| Example 13 | Loy Yang | 49.3 | 1.6 | OA | 1800 | 3 |
| Example 14 | Loy Yang | 49.3 | 1.6 | OA | 650 | 3 |

Properties of resulting product

| Examples and Comparative Examples | Primary particle size μm | Secondary particle size mm | Moisture content wt % | Ash content wt % | Volatile matter content wt % | pH | Iodine adsorption number mg/g |
|---|---|---|---|---|---|---|---|
| Comparative Example 5 | 0.062 | — | 0.0 | 0.09 | 0.6 | 6.4 | |
| Comparative Example 6 | 0.71 | — | 0.0 | 8.90 | 36.6 | 7.8 | 45 |
| Comparative Example 7 | 0.68 | 1.4 | 0.0 | 1.28 | 18.75 | 6.5 | 428 |
| Example 6 | 0.70 | 1.5 | 0.0 | 1.21 | 14.26 | 7.0 | 437 |
| Example 7 | 0.81 | 1.0 | 0.0 | 1.04 | 12.07 | 7.5 | 332 |
| Example 8 | 0.66 | 1.2 | 0.0 | 1.17 | 7.50 | 8.0 | 265 |
| Example 9 | 0.74 | 0.9 | 0.0 | 0.98 | 2.10 | 8.0 | 88 |
| Example 10 | 0.78 | 1.2 | 0.0 | 0.93 | 1.02 | 8.0 | 72 |
| Comparative Example 8 | 0.75 | 1.0 | 0.0 | 0.97 | 0.18 | 8.0 | 53 |
| Example 11 | 0.74 | 1.2 | 0.0 | 0.92 | 9.43 | 7.8 | 385 |
| Example 12 | 0.66 | 0.8 | 0.0 | 0.87 | 12.51 | 7.5 | 368 |
| Example 13 | 0.73 | 1.0 | 0.0 | 1.15 | 14.51 | 7.4 | 78 |
| Example 14 | 0.74 | 0.8 | 0.0 | 1.26 | 16.23 | 7.5 | 43 |

OA: oil-agglomeration

TABLE 3

| Examples and Comparative Examples | Amount of coal filler (parts by weight) | Carbonaceous matter content of coal filler (parts by weight) | Ash content of coal filler (parts by weight) |
|---|---|---|---|
| Comparative Example 1 | 50.0 | 40.93 | 9.07 |
| Comparative Example 2 | 45.9 | 40.93 | 4.96 |
| Comparative Example 3 | 44.6 | 40.93 | 3.65 |
| Example 1 | 42.4 | 40.93 | 1.47 |
| Example 2 | 43.4 | 40.93 | 2.44 |
| Example 3 | 41.8 | 40.93 | 0.83 |
| Example 4 | 42.8 | 40.93 | 1.85 |
| Comparative Example 4 | 42.4 | 40.93 | 1.49 |
| Example 5 | 41.3 | 40.93 | 0.34 |

Fundamental Compounding Composition

| | |
|---|---|
| (1) SBR 1500 | 100 parts by weight |
| (2) Zinc oxide No. 1 | 5 parts by weight |
| (3) Stearic acid | 1 part by weight |
| (4) Vulcanization accelerator DM | 1.2 parts by weight |
| (5) Vulcanization accelerator TS | 0.2 parts by weight |
| (6) Sulfer | 2 parts by weight |
| (7) Activator (ACTING B) | 3 parts by weight |
| (8) Coal filler | variable |

(1) The amounts of carbon blacks to be compounded in Comparative Examples 1 to 4 and Examples 1 to 5 were varied so that the amounts of carbonaceous matters in all examples were equalized to that of Comparative Example 1. In each other Comparative Examples and Examples, 50 parts by weight of carbon black was blended.

TABLE 4

| Examples and Comparative Examples | (1) Mooney viscosity ML 1 + 4 100° C. | (2) Vulcanizing time (min.) | (3) 100% Modulus (kgf/cm) | (3) 300% Modulus (kgf/cm) | (3) Tensile strength (kgf/cm) | (3) Ultimate elongation (%) | (4) Tear strength (kgf/cm) | (5) Hardness (degree) |
|---|---|---|---|---|---|---|---|---|
| Comparative Example 1 | 68.0 | 32 | 23 | 128 | 228 | 420 | 54 | 63 |
| Comparative Example 2 | 63.2 | 30 | 21 | 115 | 231 | 450 | 54 | 61 |
| Comparative Example 3 | 63.8 | 30 | 21 | 113 | 225 | 440 | 52 | 61 |
| Example 1 | 62.6 | 28 | 20 | 118 | 235 | 460 | 58 | 60 |
| Example 2 | 63.2 | 30 | 20 | 116 | 230 | 450 | 54 | 61 |
| Example 3 | 61.5 | 25 | 20 | 118 | 236 | 480 | 58 | 59 |
| Example 4 | 62.5 | 28 | 20 | 120 | 238 | 470 | 58 | 60 |
| Comparative Example 4 | 62.8 | 20 | 24 | 129 | 220 | 420 | 54 | 62 |
| Example 5 | 60.8 | 17 | 23 | 125 | 238 | 450 | 57 | 61 |

| Examples and Comparative Examples | Heat build-up ΔT (°C.) | (6) Reduction of HBU* (%) | D Set (%) | P Set (%) | (7) Flex cracking (mm/2000 times) | Reduction of flex cracking** (%) | (8) Impact resilience (%) | (9) Compression set (%) | (10) AKRON abrasion loss (CC/1000 times) | Reduction of AKRON abrasion loss (%) | Specific gravity |
|---|---|---|---|---|---|---|---|---|---|---|---|
| Comparative Example 1 | 31 | 0 | −2.29 | 4.57 | 5.4 | 0 | 62 | 15.7 | 0.2654 | 0 | 1.1497 |
| Comparative Example 2 | 30 | 3.2 | −1.72 | 2.58 | 5.1 | 5.6 | 62 | 15.3 | 0.2547 | 4.0 | 1.1306 |
| Comparative Example 3 | 30 | 3.2 | −1.86 | 3.12 | 4.9 | 9.3 | 62 | 15.2 | 0.2636 | 4.4 | 1.1243 |
| Example 1 | 28 | 9.7 | −1.72 | 2.78 | 3.7 | 31.5 | 65 | 14.6 | 0.2332 | 12.1 | 1.1153 |
| Example 2 | 30 | 3.2 | −1.80 | 2.96 | 4.6 | 14.8 | 63 | 15.0 | 0.2485 | 6.4 | 1.1204 |
| Example 3 | 27 | 12.9 | −1.72 | 2.98 | 3.6 | 33.3 | 65 | 13.5 | 0.2316 | 12.7 | 1.1098 |
| Example 4 | 28 | 9.7 | −1.73 | 2.83 | 3.7 | 31.5 | 64 | 14.7 | 0.2346 | 11.6 | 1.1170 |
| Comparative Example 4 | 28 | 0 | −1.43 | 0.83 | 4.3 | 0 | 65 | 12.0 | 0.2410 | 0 | 1.119 |
| Example 5 | 24 | 14.3 | −1.31 | 0.77 | 3.6 | 16.3 | 67 | 11.2 | 0.2220 | 7.9 | 1.1040 |

TABLE 5

| Examples and Comparative Examples | (1) Mooney Viscosity ML 1 + 4 100° C. | (2) Vulcanizing time (min.) | (3) 100% Modulus (kgf/cm) | (3) 300% Modulus (kgf/cm) | (3) Tensile strength (kgf/cm) | (3) Ultimate elongation (%) | (4) Tear strength (kgf/cm) | (5) Hardness (degree) |
|---|---|---|---|---|---|---|---|---|
| Comparative Example 5 | 72.3 | 23 | 34 | 152 | 205 | 420 | 63 | 66 |
| Comparative Example 6 | 66.0 | 38 | 18 | 33 | 62 | 620 | 30 | 59 |
| Comparative Example 7 | 72.4 | 47 | 30 | 110 | 116 | 320 | 33 | 60 |
| Example 6 | 69.1 | 33 | 33 | 169 | 201 | 380 | 54 | 63 |
| Example 7 | 67.8 | 23 | 27 | 160 | 226 | 410 | 57 | 64 |
| Example 8 | 65.0 | 23 | 25 | 157 | 242 | 470 | 55 | 60 |
| Example 9 | 62.7 | 19 | 23 | 146 | 259 | 450 | 56 | 60 |
| Example 10 | 60.8 | 18 | 22 | 115 | 210 | 490 | 54 | 60 |
| Comparative Example 8 | 59.6 | 18 | 18 | 74 | 181 | 560 | 52 | 59 |
| Example 11 | 68.1 | 24 | 27 | 167 | 232 | 400 | 56 | 64 |
| Example 12 | 70.2 | 22 | 27 | 179 | 254 | 380 | 58 | 63 |
| Example 13 | 65.5 | 22 | 28 | 160 | 232 | 410 | 56 | 63 |
| Example 14 | 58.7 | 18 | 23 | 145 | 242 | 480 | 56 | 61 |

| Examples and Comparative Examples | (6) Heat build-up ΔT (°C.) | (6) D Set (%) | (6) P Set (%) | (7) Flex cracking (mm/2000 times) | (8) Impact resilience (%) | (9) Compression set (%) | (10) AKRON abrasion loss (cc/1000 times) | Specific gravity |
|---|---|---|---|---|---|---|---|---|
| Comparative Example 5 | 26 | −1.44 | 1.58 | 15.0 | 54 | 15.2 | 0.2102 | 1.1724 |
| Comparative Example 6 | 26 | −1.15 | 3.23 | cut | 59 | 15.6 | 1.1983 | 1.0999 |
| Comparative Example 7 | 26 | −1.43 | 0.60 | cut | 66 | 11.3 | 0.6060 | 1.1100 |
| Example 6 | 24 | −1.44 | 1.03 | 13.4 | 65 | 11.7 | 0.2710 | 1.1163 |
| Example 7 | 24 | −2.00 | 2.34 | 6.0 | 60 | 17.6 | 0.2412 | 1.1279 |
| Example 8 | 23 | −2.00 | 2.47 | 3.5 | 60 | 19.9 | 0.2177 | 1.1351 |
| Example 9 | 23 | −2.28 | 1.20 | 3.2 | 60 | 16.7 | 0.2211 | 1.1443 |
| Example 10 | 24 | −2.13 | 0.87 | 3.0 | 60 | 12.3 | 0.2346 | 1.1530 |
| Comparative Example 8 | 26 | −1.25 | 0.73 | 2.8 | 59 | 12.0 | 0.2820 | 1.1673 |
| Example 11 | 23 | −2.16 | 2.18 | 7.5 | 61 | 18.2 | 0.2358 | 1.1368 |
| Example 12 | 20 | −1.43 | 1.75 | 7.3 | 60 | 16.3 | 0.1770 | 1.1293 |
| Example 13 | 22 | −1.90 | 2.44 | 5.6 | 60 | 16.8 | 0.2284 | 1.1245 |
| Example 14 | 20 | −1.82 | 2.62 | 5.0 | 58 | 18.4 | 0.2758 | 1.1206 |

INDUSTRIAL APPLICABILITY

According to the present invention, a novel economical and efficient process for producing coal fillers by the use of a coal as starting material. The process of the present invention provides coal fillers having excellent and well balanced rubber-reinforcing properties.

We claim:

1. A process for producing a coal filler, which comprises the steps of:
   (a) carbonization step, which comprises carbonizing crushed coal particles having a particle size of not more than 10 mm and an ash content of not more than 10% by weight by thermal decomposition at a temperature of 500° to 2,000° C.; and cooling the carbonized solids;
   (b) ultrafine pulverization step, which comprises preparing a slurry of the carbonized solids having a solids content of 10 to 50% by weight by adding a dispersion medium to the carbonized solids; and ultrafinely pulverizing the carbonized solids dispersed in the slurry to reduce the average particle size to not more than 5 μm;
   (c) agglomeration step, which comprises adjusting the solids content of the slurry to 1 to 20% by weight by further adding water to the slurry of the ultrafinely pulverized solids; adding an oil having a boiling point of not more than 150° C. to the resulting slurry in a ratio of 30 to 300 parts by weight of the oil per 100 parts by weight of dry solids; agitating the resulting mixture to agglomerate the carbonaceous matters with oil; and separating and recovering the agglomerates; and
   (d) drying step, which comprises drying the recovered agglomerates by heating them at 50° to 300° C. to evaporate the water and oil retained in the agglomerates; and cooling the dried agglomerates.

2. The process as claimed in claim 1, wherein, in the step (b), the carbonized solids are pulverized to not more than 200 mesh previous to the preparation of the slurry.

3. The process as claimed in claim 1, wherein, in the step (b), the slurry is prepared by adding a dispersing agent, antifoaming agent or mixtures thereof together with water.

4. The process as claimed in claim 1, wherein, in the step (b), iron contents in the slurry are removed by the means of a magnet after the preparation of the slurry.

5. The process as claimed in claim 1, wherein, in the step (b), coarse particles are classified and removed by the use of a wet classifier after the adjustment of the solids content of the slurry.

6. The process as claimed in claim 1, 2, 3, 4, or 5, wherein the oil is a hydrocarbonaceous oil.

7. The process as claimed in claim 6, wherein the carbonaceous oil is toluene.

8. The process as claimed in claim 1, 2, 3, 4, or 5, wherein the oil is a freon.

9. The process as claimed in claim 8, wherein the freon is a trichlorotrifluoroethane.

10. The process as claimed in claim 1, 2, 3, 4, or 5, wherein, in the step (c), the oil is previously mixed with a compounding ingredient for rubber, a higher fatty acid of 12 to 24 carbon atoms or mixtures therefor.

11. The process as claimed in claim 1, 2, 3, 4, or 5, wherein the oil is previously mixed with a surface modifier for the ultrafinely pulverized particles.

12. The process as claimed in claim 11, wherein the surface modifier is a process oil for rubber, an activator, or a vulcanization accelerator.

13. The process as claimed in claim 1, 2, 3, 4, or 5, wherein, in the step (c), the oil recovered in the drying step (d) is used.

* * * * *